R. A. MACK.
CHILD'S OCCUPANT PROPELLED VEHICLE.
APPLICATION FILED OCT. 27, 1920.
1,418,817.
Patented June 6, 1922.
2 SHEETS—SHEET 1.
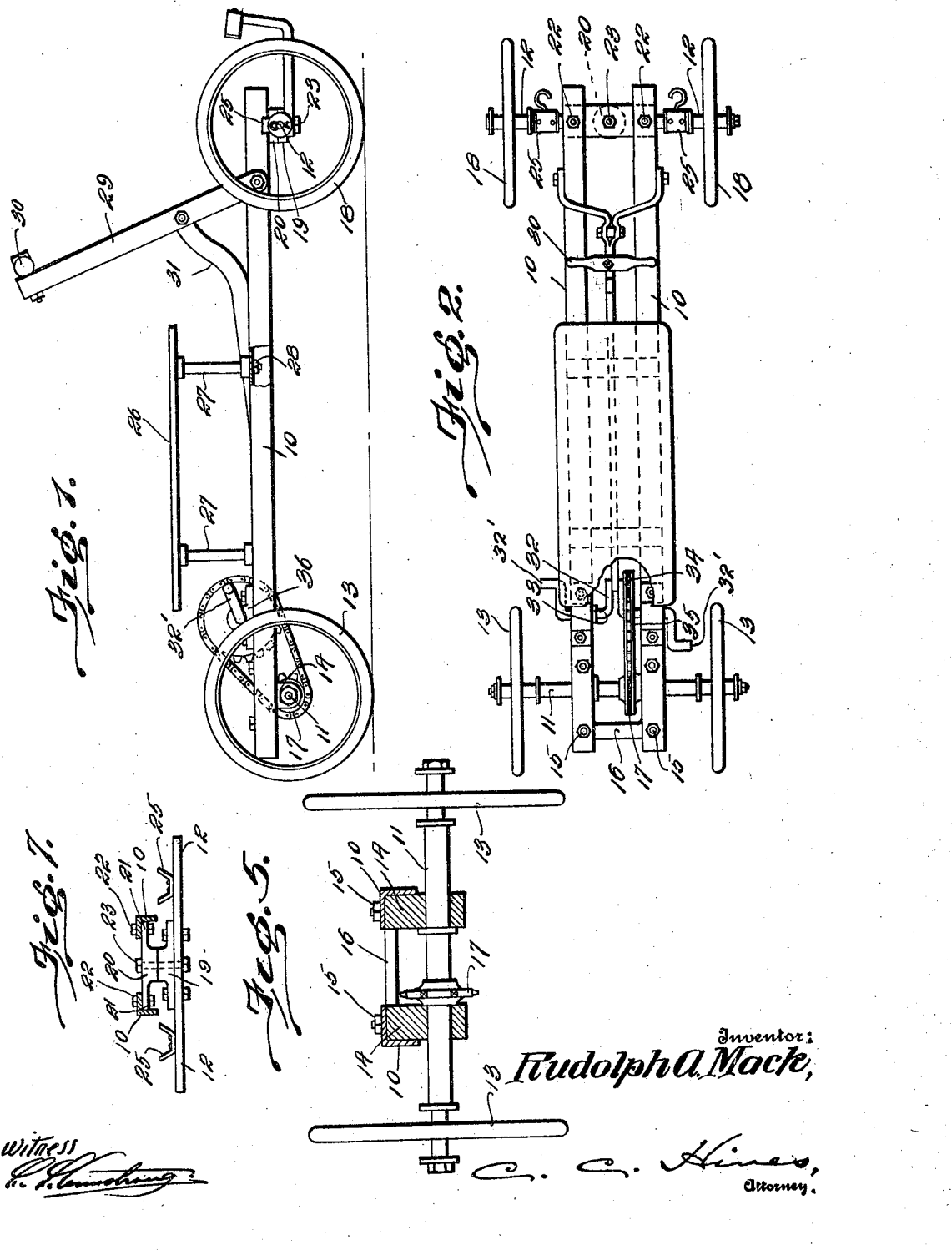
Inventor:
Rudolph A. Mack,
Attorney.

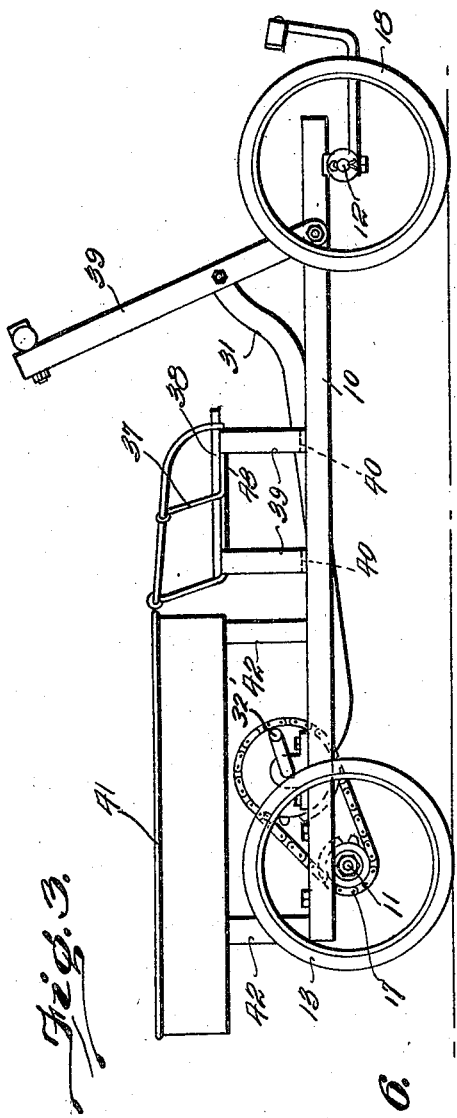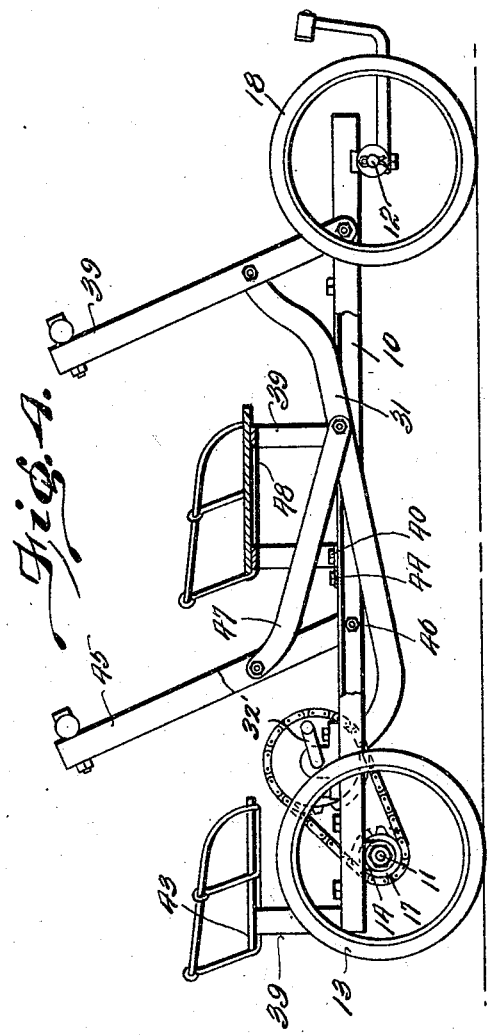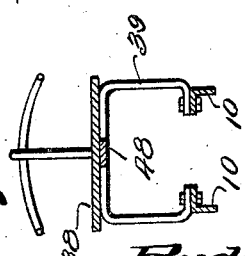

UNITED STATES PATENT OFFICE.

RUDOLPH A. MACK, OF GALLIPOLIS, OHIO.

CHILD'S OCCUPANT-PROPELLED VEHICLE.

1,418,817. Specification of Letters Patent. Patented June 6, 1922.

Original application filed June 26, 1919, Serial No. 306,941. Divided and this application filed October 27, 1920. Serial No. 419,886.

*To all whom it may concern:*

Be it known that I, RUDOLPH A. MACK, a citizen of the United States, residing at Gallipolis, in the county of Gallia and State of Ohio, have invented new and useful Improvements in Children's Occupant-Propelled Vehicles, of which the following is a specification.

This invention relates to combination vehicles and particularly to a toy vehicle capable of assuming a variety of forms, and which may be easily and conveniently converted by the child itself into any one of the forms of which the device is susceptible.

The present application is a division of my United States Patent No. 1,386,346, and the object of the invention herein disclosed is to provide a novel type of vehicle convertible from a single to a double seat vehicle at will or to support a seat and a wagon body or the like, and which embodies improved propelling means and an improved mode of mounting the gearing thereof.

The invention consists of the features of construction, combination and arrangement of parts hereinafter described and claimed, reference being had to the accompanying drawings, in which:—

Figure 1 is a side elevation of a vehicle embodying my invention in one of its forms.

Figure 2 is a top plan view thereof.

Figure 3 is a side elevation of another form of the invention.

Figure 4 is a sectional side elevation of still another form of the invention.

Figure 5 is an enlarged transverse sectional view illustrating the rear axle of the vehicle.

Figure 6 is a sectional view through one of the seats of the vehicle, illustrating the manner in which the same is mounted upon the vehicle chassis.

Figure 7 is a cross section showing the front axle construction.

The invention consists essentially in a frame comprising a part of the chassis of the vehicle, to which a number of bodies or seats may be applied, and which is supported by a wheeled running gear. The bars constituting this frame are indicated at 10, and comprise angle bars as shown. These angle bars are straight throughout their lengths and are arranged in spaced parallel relation, being detachably connected together and rigidly held as a unit by the devices and elements to be hereafter detailed.

The running gear of the vehicle comprises rear (driving) and front (steering) axles 11 and 12 respectively. The rear axle is disposed beneath the frame bars 10 and transversely of the latter, and wheels 13 are affixed to the spindles thereof. This axle is rotatably mounted in bearing blocks 14 spaced apart a distance substantially equal to the distance between the spaced parallel bars 10, and these blocks fit beneath the said bars and are bolted thereto as at 15. These blocks at their rear ends are connected together by a tie plate 16, the latter being preferably formed integral with the bearing blocks, but it will be understood that the tie plate may be separate from the blocks and may be bolted or riveted to the latter as desired. The axle 11 is provided intermediate its ends with a gear or sprocket 17, the latter being disposed between the bars 10 of the frame. The bearing blocks 14 and tie plate 16 thus, in addition to firmly supporting the axle 11, securely hold the bars 10 in proper spaced relation at their rear ends.

The front axle 12 is preferably of a length equal to that of the rear axle, and its spindles rotatably support the front or steering wheels 18. This front axle has arranged intermediate its ends and upon its upper side a wear plate constituting a fifth wheel 19, which may be cast with or welded to the axle or may be bolted thereto as desired. This fifth wheel bears against a plate 20 affixed to the forward ends of the spaced bars 10, and this plate may be provided with the projections 21 to engage beneath the angle bars 10 and to be bolted thereto as at 22. The plate and its projections thus form a firm support for the fifth wheel of the steering axle and also rigidly maintain the forward ends of the frame bars 10 in proper spaced relation. A king bolt 23 passes through alined openings in the fifth wheel 19 and plate 20 to rotatably support the steering axle upon the said plate. The front axle is provided at its ends with eyes as shown to enable a draft tongue or shafts to be applied thereto if desired, and said axle is also provided at its ends with foot plates 25 for the use of the occupant in resting his feet and to enable him to apply foot pressure to swing the axle and thereby steer the vehicle.

In Figure 1 of the drawings there is illustrated a familiar type of occupant propelled vehicle in which the seat for the occupant is indicated at 26, and comprises a board structure of suitable length and breadth mounted upon and spaced above the frame members of the chassis. This seat has depending therefrom the spaced supports 27, which carry shoulders to rest upon the bars 10, and the lower ends of these supports protrude through openings in the said bars; nuts 28 being applied to the protruding lower ends of the supports to hold the seat firmly in position. In this construction suitable propelling mechanism is provided for driving the vehicle, the same comprising a lever 29 pivoted to the bars 10 at its lower end and having at its upper end a handle bar 30 by means of which it may be swung back and forth. A link 31 connects this lever with a crank 32 on a transverse transmission shaft 33 provided with a sprocket gear 34 longitudinally alined with the gear or sprocket 17 affixed to axle 11, and a sprocket chain 35 passes over these alined sprocket gears as shown. The transmission 33 is also provided with end cranks 32', whereby other forms of driving means may be coupled thereto, as shown in my United States Patent, No. 1,386,346, above referred to. The transmission shaft is mounted in bearings 36 bolted or in any manner removably applied to the frame bars 10. As shown the link 31 is longitudinally curved so that it may have the motion of a connecting rod substantially in the space between the bars 10. It will be obvious from this construction that by reciprocating motion applied to the lever the driving mechanism will be operated to propel the vehicle.

Figure 3 of the drawings shows another form of the vehicle, the change residing essentially in the seat and body members supported by the frame bars. In this form of the invention an individual seat 37 is used, being positioned upon the frame at a point which will allow the occupant to conveniently reach and operate the lever 39. This seat comprises a base 38 having secured to the underside thereof the spaced inverted U-shaped spring-metal bracket members 39 secured at their bight portions to the seat and having their arms provided at their lower ends with angularly bent feet 40 resting upon the upper surfaces of the angle bars 10. Bolts may be passed through the feet and openings in the angle bars to firmly hold the seat positioned upon the frame. The frame has also arranged thereon a wagon body 41, which has upon the underside thereof similar spring-metal brackets 42, having their arms similarly provided with feet resting upon and bolted to the frame bars 10. This construction provides a seat for the occupant who propels the vehicle and a body in which various articles may be transported or in which a second person may sit.

Figure 4 of the drawings shows a further form of the invention, wherein a power tandem runabout is provided. The construction of the device in this form is similar to that shown in Figure 3 excepting that the body 41 is omitted and a second seat 43 is substituted therefor, the vehicle also providing means whereby the occupant of this second seat may assist in developing propelling power. The seat 43 is similar to the seat 37 above described and is arranged at or near the extreme rear end of the chassis. The occupant of this second seat may rest his feet in the stirrup or plate 44 secured upon and extending transverse of the frame. The lever 45 is pivoted to the frame as at 46, within convenient reach of the occupant of the second seat, and this lever is connected with the link 31 by means of a second link or pitman 47. It is obvious, therefore, that the occupants of both seats of the vehicle in this form of the invention may contribute to the propulsion of the vehicle, as the power developed in lever 45 is transmitted to the link 31 by means of the pitman 47. As in the form shown in Figures 1 and 3, the vehicle is steered by the feet of the occupant of the front seat of the vehicle.

The individual seats disclosed in connection with the above types of vehicles may include the inverted U-shaped spring metal hangers, above described, arranged in spaced relation and having the inturned feet at their lower ends to rest upon the frame bars, and these spaced U-members are connected by a strap iron 48. This strap iron may be formed integral with the U-shaped spring members, or may be welded thereto or bolted as desired, and it is obvious that such structure greatly strengthens the seat supports and enables the latter to withstand the strains and pressures to which they are subjected in service.

In practice, the angle bars 10 are provided with holes at proper points to receive the bolts whereby various bodies and seat supports may be fastened thereto, thus providing for the interchangeable use of devices of this kind; and therefore it is obvious that I have produced a vehicle structure capable of a variety of changes in form, all of which changes may be readily made by a child of ordinary intelligence and without the use of special skill or tools. The changes from one form of vehicle to the other may be quickly made, and the simplicity of the construction of the various removable parts enables the various structures to be completed without danger of confusion or breakage or distortion of any of such parts.

While the foregoing is a description of the preferred embodiment of the invention, it is to be understood that variations may be made in the minor details without departing from the invention as defined by the claims.

Having thus described my invention, I claim—

1. In a device of the class described, a frame, drive and steering axles on said frame, a transmission shaft on said frame, a crank on said shaft, a gear on said shaft operatively connected with said drive axle, a pair of levers pivoted in spaced relation on the longitudinal center of said frame, a link connecting one of said levers with said crank, and a second link connecting the other of said levers with the first mentioned link.

2. In a device of the class described, a frame, a drive axle on said frame, a transmission shaft on said frame, a power connection between said transmission shaft and said axle, a crank on said transmission shaft, a pair of levers pivoted in spaced relation and one in advance of the other upon said frame substantially along the line of the longitudinal axis thereof, a longitudinally curved link connecting the forward lever with the crank on the transmission shaft, and a link connecting the rear lever with the first named link in advance of the transverse center of the latter.

3. In a device of the class described, a frame including spaced parallel bars, a transverse drive axle journaled in bearings upon and disposed in a plane below the plane of the bars, a transverse transmission shaft journaled in bearings upon and disposed in a plane above the plane of the bars, said shaft having a crank portion movable in the space between the bars, drive gearing between said axle and shaft, a pair of operating levers pivotally mounted to the bars for swinging movement along the line of the longitudinal axis of the frame, and a longitudinally curved link coupling one of said levers to the crank portion of the transmission shaft, said link being movable longitudinally in the space between the bars, and a second link also movable in the space between the bars and coupling the other lever to the first-named link.

4. In a device of the class described, a frame, including spaced parallel bars, a transverse drive axle journaled in bearings upon and disposed in a plane below the plane of the bars, a transverse transmission shaft journaled in bearings upon and disposed in a plane above the plane of the bars, said shaft having a crank portion movable in the space between the bars, an operating lever pivotally mounted at its lower end upon the bars, a longitudinally curved link pivotally coupled at its rear end to the crank portion of the transmission shaft and at its forward end to the operating lever above the pivotal point of the latter, said link being movable longitudinally in the space between the bars, a second lever pivotally mounted upon the bars in rear of the first-named lever, and a link connecting said second lever with the first-named link.

5. In a vehicle of the character described, a frame, a drive axle for said frame, an oscillatory lever detachably connected to said frame, a second lever readily applicable to and removable from said frame, a link connected at one end with said first lever and operatively connected at its opposite end with said drive axle, and a second link readily applicable to and removable from said second lever and adapted to be attached to said first-mentioned link.

In testimony whereof I affix my signature.

RUDOLPH A. MACK.